United States Patent
Ramaraju et al.

(10) Patent No.: US 7,185,170 B2
(45) Date of Patent: Feb. 27, 2007

(54) DATA PROCESSING SYSTEM HAVING TRANSLATION LOOKASIDE BUFFER VALID BITS WITH LOCK AND METHOD THEREFOR

(75) Inventors: Ravindraraj Ramaraju, Round Rock, TX (US); David P. Burgess, Austin, TX (US); Troy L. Cooper, Austin, TX (US); Eric V. Fiene, Austin, TX (US); George P. Hoekstra, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 303 days.

(21) Appl. No.: 10/928,399

(22) Filed: Aug. 27, 2004

(65) Prior Publication Data

US 2006/0047935 A1    Mar. 2, 2006

(51) Int. Cl.
*G06F 12/00* (2006.01)
*G06F 9/26* (2006.01)
*G06F 9/34* (2006.01)

(52) U.S. Cl. .................................................... 711/202
(58) Field of Classification Search ................. 711/202
See application file for complete search history.

(56) References Cited

U.S. PATENT DOCUMENTS

| 4,589,092 A | | 5/1986 | Matick |
| 5,530,824 A | * | 6/1996 | Peng et al. ................ 711/207 |
| 5,539,892 A | | 7/1996 | Reininger |
| 5,586,283 A | * | 12/1996 | Lopez-Aguado et al. ... 711/207 |
| 5,630,088 A | * | 5/1997 | Gupta et al. ............... 711/207 |
| RE37,305 E | * | 7/2001 | Chang et al. .............. 711/207 |
| 6,519,684 B1 | | 2/2003 | Moyer |
| 6,675,266 B2 | | 1/2004 | Quach et al. |
| 6,775,746 B2 | | 8/2004 | Quach et al. |
| 6,904,502 B2 | | 6/2005 | Quach et al. |
| 2002/0069327 A1 | | 6/2002 | Chauvel |

* cited by examiner

*Primary Examiner*—Hyung Sgugh
*Assistant Examiner*—Hamdy S. Ahmed
(74) *Attorney, Agent, or Firm*—Daniel D. Hill; Robert L. King

(57) ABSTRACT

A system (10) translates memory addresses. Processing circuitry (12) provides an effective address to a storage array (14, 16) having a plurality of stored effective addresses, each of the plurality of stored effective addresses having a corresponding pair of a lock bit and a valid bit. An output tag value and a single valid bit are provided to a comparator (18). The lock bit defines one of two predetermined classes of tasks executed by the system. The single valid bit is applicable to both of the two predetermined classes of tasks. The lock bit qualifies the clearing of the single valid bit. The comparator respectively compares the output tag value and the single valid bit with a predetermined effective address and a predetermined bit value. An output hit signal is provided when a match occurs to validate a physical address provided by a physical address array (20).

22 Claims, 2 Drawing Sheets

DATA PROCESSING SYSTEM HAVING TRANSLATION LOOKASIDE BUFFER VALID BITS WITH LOCK AND METHOD THEREFOR

FIELD OF THE INVENTION

The present invention relates generally to data processing, and more particularly, to a data processing system having a translation lookaside buffer (TLB) having valid bits with corresponding lock bits.

RELATED ART

Today's high performance data processing systems rely on sophisticated memory systems to translate logical, or effective, addresses into real, or physical, addresses. Logical addresses are the software addresses used by the programmer when writing software. Physical addresses are the hardware addresses used by the semiconductor chips and electronic circuitry running the software.

A memory management unit (MMU) with TLBs is used to control accesses to physical devices for multi-tasking data processing systems. The MMU, using one or more of the TLBs, performs the address translation and privilege checking for the logical address and, if the mapping found in the TLB is valid, as determined by at least one of a plurality of valid bits being set, drives the corresponding physical address to the data or instruction cache or some other type of memory.

The main advantage of a TLB is to save processing time. However, checking valid bits during a TLB look up can add to the time required to generate a hit or miss signal because additional logic gates may be required to combine multiple valid bits in the output path when generating a hit/miss signal. Therefore, it would be advantageous to minimize the time required to generate a hit or miss signal.

BRIEF DESCRIPTION OF THE DRAWINGS

The present invention is illustrated by way of example and not limited by the accompanying figures, in which like references indicate similar elements, and in which.

Figure 1:
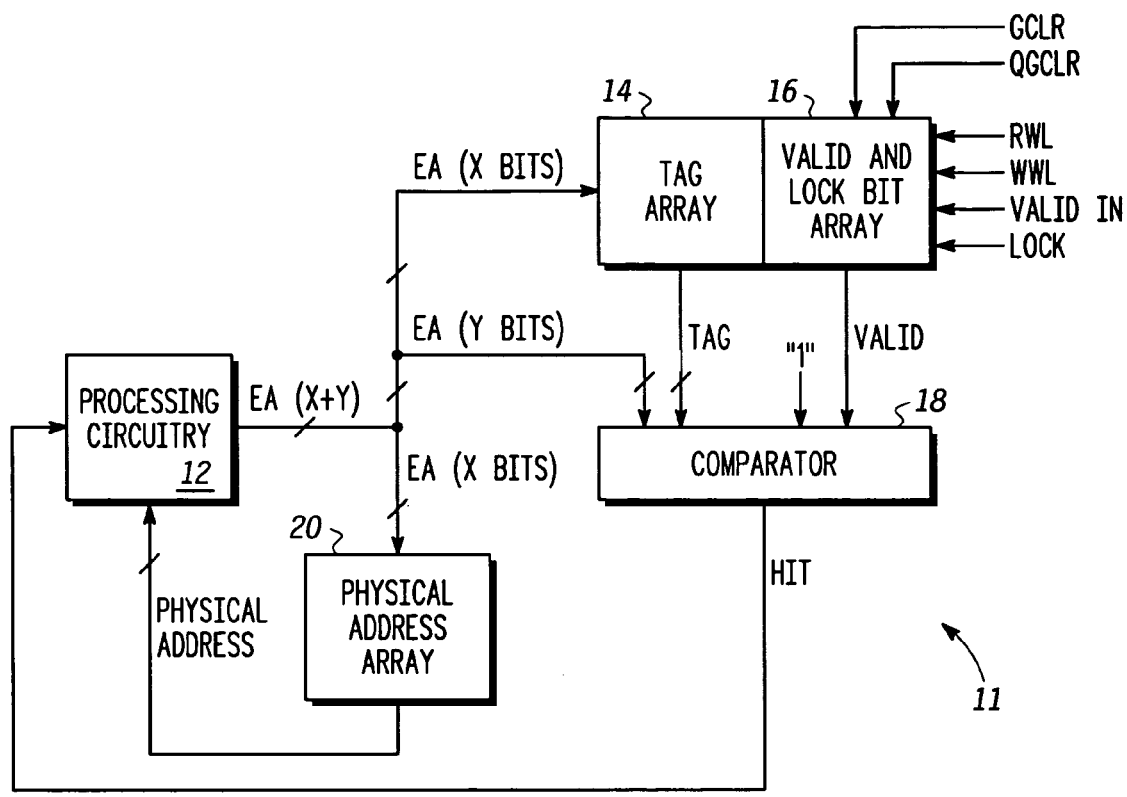
FIG. 1 illustrates, in block diagram form, a data processing system in accordance with an embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, the plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Generally, the present invention provides a TLB in a multi-tasking data processing system that includes a lock bit associated with each valid bit. The valid bit with lock is used to characterize processes, or tasks, into one of two predetermined classes. For example, if a valid bit corresponding to one entry in a TAG array has its associated lock bit set, then the entry is valid for two classes, for example, if the TAG array entry is valid for two active processes. Two invalidation options are provided for clearing the array depending on which class the TAG entries belong. In one option, only the valid bits that do not have their corresponding lock bits set are cleared, indicating that the entries with corresponding lock bits set are valid for more than one process. This eliminates the overhead of having to reload TLB entries that are valid for more than one class of processes. In another option, all of the valid bits and lock bits are cleared without reference to the lock bits. Clearing all of the valid bits would be done, for example, during a system reset operation. The single valid bit is provided to the speed critical path of the translation while the lock bit is not.

Providing a lock bit that is not part of the speed critical path allows for a multi-tasking data processing system that outputs only one valid bit per entry. Using one valid bit provides an advantage of eliminating the need for combinational logic in the speed critical path that would be needed in prior art systems having more than one valid bit per entry. Also, the use of a lock bit to define an additional class of entries allows the TAG array to be selectively cleared based on the value of the lock bit.

FIG. 1 illustrates, in block diagram form, a data processing system 10 in accordance with an embodiment of the present invention. Data processing system 10 includes a TLB 11 and a processing circuitry 12. The processing circuitry 12 may be a central processing unit (CPU), a microprocessor core, a MMU, a digital signal processor (DSP), or other circuitry that requires the translation of effective addresses to physical addresses. TLB 11 includes a TAG array 14, a valid and lock bit array 16, a comparator 18, and a physical address array 20.

The processing circuitry 12 is coupled to provide an effective address (logical address) labeled "EA(X+Y)". A portion of the effective address labeled EA(X bits) is provided to the TAG array 16 to select one of a plurality of TAG entries. The X bits may be, for example, the most significant address bits of the effective address. The Y bits of the effective address may be, for example, the least significant bits of the effective address and are provided to one input of the comparator 18. The X bits are also provided to the physical address array 20. If an entry in the TAG array 14 corresponds to the address EA(X BITS), then a TAG address labeled "TAG" is provided to an input of comparator 18. A valid bit and a lock bit are associated with each of the TAG entries and are selected when the corresponding TAG entry is selected. In response to receiving the effective address, the valid and lock bit array 16 provides a signal labeled "VALID" to an input of the comparator 18. The valid bit and lock bit array 16 may be part of the TAG array or separate from the TAG array.

Figure 3:
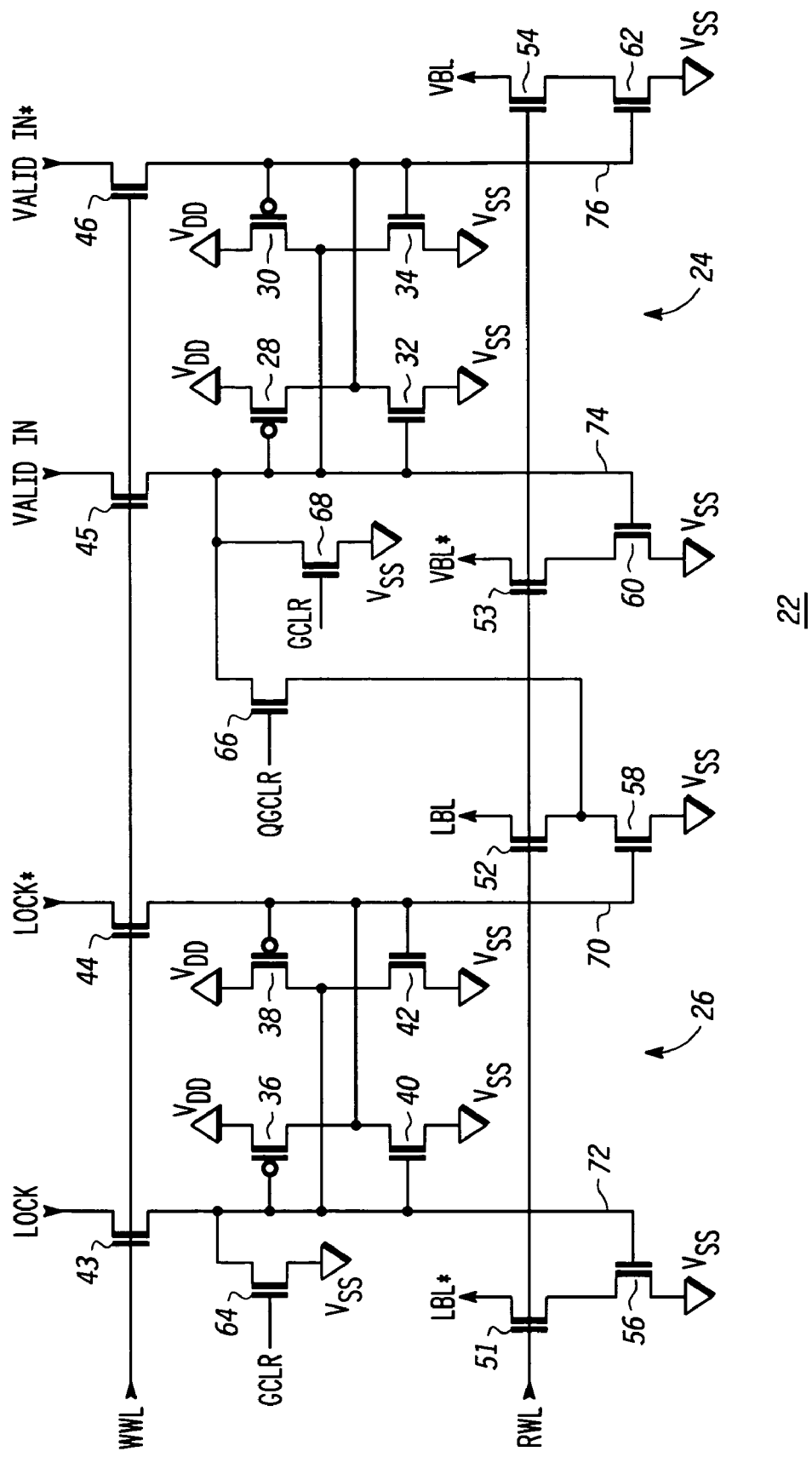
FIG. 3 illustrates, in schematic diagram form, a valid bit and lock bit cell of the valid and lock bit array of FIG. 1.

The valid and lock bit array 16 receives a global clear signal labeled "GCLR", a qualified global clear signal labeled "QGCLR", a read word line signal labeled "RWL", a write word line signal labeled "WWL", and valid bit input signal labeled "VALID IN", and a lock input signal labeled "LOCK". The valid and lock bit array includes a plurality of valid and lock bit cells. A valid bit and lock bit cell 22 is illustrated in FIG. 3 and will be described later. During a translation, the VALID signal is compared to a logical "1" and the TAG is compared to EA(Y BITS). If they match, a HIT signal is provided to indicate that the physical address is loaded in physical address array 20 and the corresponding physical address labeled "PHYSICAL ADDRESS" is provided to processing circuitry 12. Conversely, if there is not a HIT signal generated because, for example, the TAG does not match the EA(Y BITS), then an exception or interrupt is generated and a lower level of memory must be accessed to obtain the necessary physical address.

When writing to the valid and lock bit array 16, the WWL signal corresponding to the EA(X BITS) address is asserted while a logical "1" VALID IN signal is provided to the selected valid bit of the array 16 and either a logical "0" or a logical "1" is provided to the lock bit depending upon which class the TAG entry belongs. Likewise, a valid bit of the valid and lock bit array 16 is read by asserting the RWL signal corresponding to the EA(X BITS) address and reading the stored logic state. The stored logic state from the read operation is provided as signal VALID to the comparator 18.

When changing between tasks, or processes in data processing system 10, valid bits and lock bits from the valid and lock bit array 16 and corresponding TAG array entries from TAG array 14 are cleared, or invalidated while writing new TAG addresses to TAG array 14. Data processing system 10 can run two classes of processes. TAG array entries can be in one of the two classes, or in both classes. If a TAG array entry can belong in only one class, then the lock bit corresponding to the valid bit for the TAG array entry is not set. If a TAG array entry can belong in both classes simultaneously, than the lock bit corresponding to the valid bit for the TAG entry is set.

All of the valid bits and lock bits may be cleared, for example, during a system reset operation. In FIG. 1, to clear all of the valid bits and lock bits, the signal GCLR is asserted. To clear only the bits that do not have a lock bit set, the QGCLR signal is asserted. This may be done when another process is substituted for an active process in the same class. In the illustrated embodiment, processes are in the same class as indicated by the lock bits being set.

Figure 2:
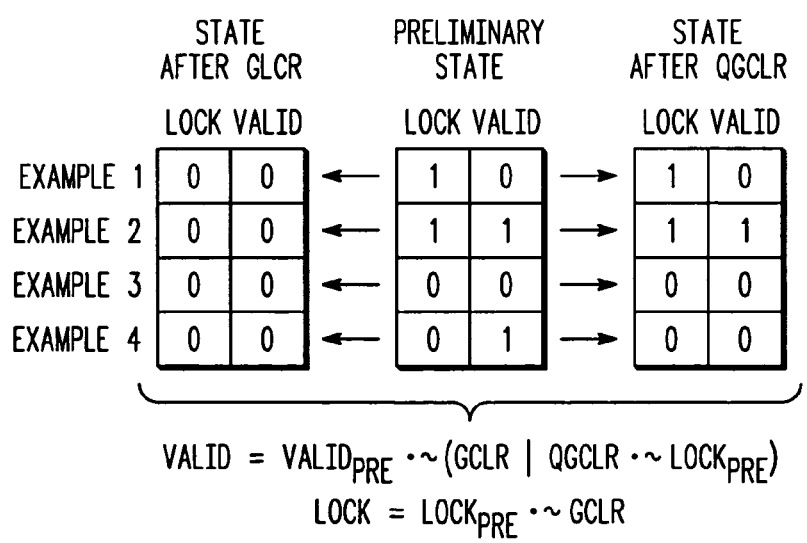
FIG. 2 illustrates a table of valid bit and lock bit states before and after two clearing operations in accordance with an embodiment of the present invention.

FIG. 2 illustrates a table of valid bit and lock bit states before and after two clearing operations in accordance with an embodiment of the present invention. In FIG. 2, the preliminary states of the lock bit and valid bit is provided as four examples. The state of the lock bit and valid bit is provided for each of the four examples after the global clear (GCLR) and the qualified global clear (QGCLR) is performed.

FIG. 3 illustrates, in schematic diagram form, a valid bit and lock bit cell of the valid and lock bit array 16 of FIG. 1. Valid bit and lock bit cell 22 includes a valid bit cell 24, a lock bit cell 26, write access transistors 43–46, read access transistors 51–54, and transistors 56, 58, 60, 62, 64, and 66. In the illustrated embodiment, cells 24 and 26 are dual port memory cells, however, in other embodiments, cells 24 and 26 can be any type of memory cell including, but not limited to, SRAM (static random access memory), DRAM (dynamic random access memory), or a non-volatile memory such as flash. Each of the cells includes a cross-coupled pair of inverters to provide the storage element. The cross-coupled pair of lock bit 26 is accessed for a write operation via N-channel transistors 43 and 44. The cross-coupled pair of valid bit cell 24 is accessed for a write operation via N-channel transistors 45 and 46. Note that all of the transistors illustrated in FIG. 3 are N-channel MOS (metal-oxide semiconductor) transistors except for the load transistors 28, 30, 36, and 38, which are P-channel MOS transistors. The cross-coupled pair of lock bit cell 26 is accessed for a read operation via transistors 51 and 52. The cross-coupled pair of the valid bit cell 24 is accessed for a read operation via transistors 53 and 54.

During a write operation to the lock bit 26, a differential lock signal LOCK and LOCK* is provided to access transistors 43 and 44. Note that an asterisk (*) after a signal name indicates that the signal is a logical complement of a signal having the same name but lacking the asterisk. The signal WWL is asserted as a logical high to cause transistors 43 and 44 to be conductive. The logic state of the lock signal is stored on nodes 70 and 72 of the cross coupled pair comprising transistors 36, 38, 40, and 42.

The value stored on nodes 70 and 72 of lock bit cell 26 is read by asserting RWL as a logical high, causing transistors 51 and 52 to be conductive. If a logical high is stored on node 72, for example, then transistor 56 is conductive, and the value provided at the lock bit cell output LBL* will be a logical low. A logical low will be stored on node 70 causing transistor 58 to be substantially non-conductive, and a logical high will be provided at the lock bit cell output LBL. Note that in the illustrated embodiment the lock bit is only read during operation in test mode. A benefit of the present invention is that the lock bit is not read during normal operation of data processing system 10. As illustrated in FIG. 1, only the valid bit is read out of the valid and lock bit array 16 during a translation.

The valid bit cell 24 is written to and read from in a manner similar to the lock bit cell 26 as described above. However, during a read operation, the state of the valid bit cell 24 is read out and provided to the comparator 18 as described above in the description of FIG. 1.

To clear the lock bit cell 26 and the valid bit cell 24 during a global clear operation, a logical high signal GCLR is provided to the gates of transistors 64 and 68 while signals WWL and RWL are low. Transistors 64 and 68 are conductive, pulling node 72 of lock bit cell to a logical low voltage, which flips the stored state of node 70 to a logical high. Likewise, node 74 of valid bit cell 24 is pulled to a logical low voltage causing node 76 to be flipped to a logical high.

Transistors 66 and 58 function to provide a logical ANDing of the lock bit value and the value of signal QGCLR. During a qualified global clear operation, the lock bit and the valid bit will only be cleared, or invalidated, if the voltage stored on node 70 is a logical high voltage. That is, if QGCLR is high, transistor 66 is conductive. Node 74 will be pulled low if transistor 58 is conductive. Transistor 58 is conductive when node 70 is a logical high voltage.

As described above, the illustrated embodiment of the present invention provides a lock bit that is not part of the speed critical path. This allows for a multi-tasking data processing system that outputs only one valid bit per entry. Using one valid bit per entry provides an advantage of eliminating the need for combinational logic in the speed critical path that would be needed in prior art systems having more than one valid bit per entry. Also, the use of a lock bit to define an additional class of entries allows the TAG array to be selectively cleared based on the value of the lock bit.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. The terms a or an, as used herein, are defined as one or more than one. The terms including and/or having, as used herein, are defined as comprising (i.e., open language). As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for translating memory addresses, comprising:
   processing circuitry that provides an effective address;
   a storage array coupled to the processing circuitry for receiving the effective address, the storage array having a plurality of stored effective addresses, each of the plurality of stored effective addresses having a corresponding pair of a lock bit and a valid bit and providing an output tag value and a single valid bit, the lock bit defining one of two predetermined classes of tasks executed by the system, the single valid bit being applicable to both of the two predetermined classes of tasks, the lock bit qualifying the clearing of the single valid bit; and
   a comparator coupled to the storage array for receiving the output tag value and the single valid bit, the comparator comparing the output tag value and the single valid bit with a predetermined effective address that is provided by the processing circuitry, the comparator providing an output hit signal to the processing circuitry when the valid bit provided by the storage array has a predetermined value and when the output tag value matches the predetermined effective address that is provided by the processing circuitry.

2. The system of claim 1 further comprising multiple tasks within at least one of the two predetermined classes of tasks.

3. The system of claim 1 wherein the storage array further comprises a first control input for receiving a global clearing signal, the global clearing signal clearing all valid bits.

4. The system of claim 1 wherein the storage array further comprises a first control input for receiving a global clearing signal, the global clearing signal clearing all valid bits and all lock bits.

5. The system of claim 1 wherein the storage array further comprises a first control input for receiving a qualified global clearing signal, the qualified global clearing signal clearing only those valid bits whose corresponding lock bits are not asserted.

6. The system of claim 1 wherein the storage array further comprises a first control input for receiving a qualified global clearing signal, the qualified global clearing signal clearing only those valid bits associated with one of the two predetermined classes of tasks.

7. The system of claim 1 wherein each lock bit maintains a predetermined preliminary lock bit value until a global clear signal is provided to the storage array.

8. The system of claim 1 wherein the storage array further comprises:
   a tag array for storing a plurality of tags, each of the plurality of tags representing an effective address; and
   a valid and lock bit array for storing a plurality of pairs of the lock bit and the valid bit, each of the pairs of the lock bit and the valid bit corresponding to a respective one of the plurality of tags.

9. The system of claim 8 wherein the valid and lock bit array further comprises a plurality of valid and lock bit cells, each of the plurality of valid and lock bit cells comprising:
   a first memory cell for storing a predetermined lock bit;
   a second memory cell for storing a predetermined valid bit that is paired with the predetermined lock bit; and
   circuitry for logically ANDing a value of the lock bit with a qualified global clear signal.

10. The system of claim 9 wherein the circuitry for logically ANDing the value of the lock bit with the qualified global clear signal further comprises a transistor having a control electrode for receiving the qualified global clear signal, a first current electrode coupled to the first memory cell and a second current electrode coupled to the second memory cell.

11. The system of claim 1 further comprising:
    a physical address array coupled to the processing circuitry for receiving the effective address, the physical address array providing a physical address corresponding to the effective address to the processing circuitry.

12. A method for translating memory addresses, comprising:
    providing an effective address to an array containing a plurality of effective addresses, each of the plurality of effective addresses having a corresponding pair of a lock bit and a valid bit, the lock bit defining one of two predetermined classes of tasks executed by the system;
    in response to receiving the effective address, providing an output tag value and a single valid bit, the single valid bit being applicable to both of the two predetermined classes of tasks, the lock bit qualifying the clearing of the single valid bit;
    comparing the output tag value and the single valid bit with a predetermined effective address; and
    providing an output hit signal when the valid bit provided by the storage array has a predetermined value and when the output tag value matches the predetermined effective address that is provided by the processing circuitry.

13. The method of claim 12 further comprising:
    providing multiple tasks within at least one of the two predetermined classes of tasks.

14. The method of claim 12 further comprising:
    receiving a global clearing signal and clearing all valid bits in response to the global clearing signal.

15. The method of claim 12 further comprising:
    receiving a global clearing signal and clearing all valid bits and all lock bits in response to the global clearing signal.

16. The method of claim 12 further comprising:
    receiving a qualified global clearing signal and clearing only those valid bits whose corresponding lock bits are not asserted in response to the qualified global clearing signal.

17. The method of claim 12 further comprising:
receiving a qualified global clearing signal, the qualified global clearing signal clearing only those valid bits associated with one of the two predetermined classes of tasks.

18. The method of claim 12 further comprising:
maintaining a predetermined preliminary lock bit value for each lock bit until a global clear signal is provided to the storage array.

19. The method of claim 12 further comprising:
storing a plurality of tags in a tag array, each of the plurality of tags representing an effective address; and
storing a plurality of pairs of the lock bit and the valid bit in a valid and lock bit array, each of the pairs of the lock bit and the valid bit corresponding to a respective one of the plurality of tags.

20. The method of claim 19 further comprising:
storing a predetermined lock bit in a first memory cell;
storing a predetermined valid bit that is paired with the predetermined lock bit in a second memory cell; and
logically ANDing a value of the lock bit with a qualified global clear signal.

21. The method of claim 20 further comprising:
logically ANDing the value of the lock bit with the qualified global clear signal further with a transistor having a control electrode for receiving the qualified global clear signal, a first current electrode coupled to the first memory cell and a second current electrode coupled to the second memory cell.

22. The method of claim 12 further comprising:
providing a physical address corresponding to the effective address to the processing circuitry; and
using the physical address in response to assertion of the output hit signal.

* * * * *